United States Patent [19]

Casper et al.

[11] Patent Number: 5,256,707
[45] Date of Patent: Oct. 26, 1993

[54] CONTINUOUS PROCESS FOR CONCENTRATING POLYMER SOLUTIONS UP TO A REQUIRED SPECIFICATION LEVEL OF RESIDUAL SOLVENTS

[75] Inventors: Clemens Casper; Jörgen Weinschenck, both of Krefeld, Fed. Rep. of Germany

[73] Assignee: Bayer Aktiengesellschaft, Fed. Rep. of Germany

[21] Appl. No.: 673,731

[22] Filed: Mar. 22, 1991

[30] Foreign Application Priority Data

Apr. 7, 1990 [DE] Fed. Rep. of Germany ....... 4011383

[51] Int. Cl.$^5$ .............................................. C06L 31/00
[52] U.S. Cl. .................................... 523/318; 159/2.1; 159/2.2; 159/2.3
[58] Field of Search ................... 523/318; 159/2.1-2.3

[56] References Cited

U.S. PATENT DOCUMENTS

| | | | |
|---|---|---|---|
| 3,395,746 | 8/1968 | Szabo et al. | 159/47 |
| 3,550,669 | 12/1970 | Lippert | 159/6 |
| 3,834,441 | 9/1974 | Vernaleken | 159/49 |
| 4,181,788 | 1/1980 | Wingler | 526/68 |
| 4,686,279 | 8/1987 | Nagtzaam et al. | 528/501 |

FOREIGN PATENT DOCUMENTS

| | | |
|---|---|---|
| 1667051 | 9/1967 | Fed. Rep. of Germany . |
| 1921045 | 4/1969 | Fed. Rep. of Germany . |
| 1645600 | 12/1970 | Fed. Rep. of Germany . |
| 274360 | 12/1978 | Fed. Rep. of Germany . |
| 1243011 | 8/1971 | United Kingdom . |
| 1282922 | 7/1972 | United Kingdom . |
| 1282992 | 7/1972 | United Kingdom . |

*Primary Examiner*—Paul R. Michl
*Assistant Examiner*—Edward Cain
*Attorney, Agent, or Firm*—Connolly & Hutz

[57] ABSTRACT

In concentrating polymer solutions up to a desired specification level of residual solvents, encrustations can be prevented and the yield and the degree of purity can be increased, when the product is heated up under pressure, expanded through a restrictor element (3) with vapor formation into a first, preferably coiled flow pipe (7) and concentrated therein as far as possible, the mixture of vapors and polymer solution is whirled at an angle into a second flow pipe (9) in a sloping arrangement and fitted with self-cleaning elements (11, 12) and concentrated therein up to the desired level, and vapors and concentrate are separately discharged only downstream thereof.

5 Claims, 2 Drawing Sheets

CONTINUOUS PROCESS FOR CONCENTRATING POLYMER SOLUTIONS UP TO A REQUIRED SPECIFICATION LEVEL OF RESIDUAL SOLVENTS

The invention relates to a continuous process for concentrating polymer solutions up to a required specification level of residual solvents, the product being heated up under pressure and then being expanded in a restrictor element with vapour formation into a heated flow pipe and thus being concentrated.

Several problems arise in concentrating polymer solutions up to residual solvent contents in the ppm range:

Polymers are very sensitive to high temperatures Further polymerisation, stippling and colour changes can occur. Accordingly, short residence times are demanded for the concentrating process, which presupposes good heat and mass transfer. Towards the end of the process, the viscosity of the melt becomes very high and can assume values of up to 1000 Pa.s. The specification requirements for polymers are in general at residual solvent contents in the ppm range. This means that good mixing of the product with continuous renewal of the surface must still take place even in the end phase of the process, when the viscosity is in the range of 100 to 1000 Pa.s. At an unduly long residence time in this process phase at the high temperatures, the product would otherwise suffer extensive thermal damage.

It has been found that a large part of the concentrating process can also be carried out in a simple, heatable flow pipe which preferably has a steady curvature (German Patent Specification 1,667,051 corresponding to British Patent Specification 1,243,011 and German Patent Specification 1,921,045, corresponding to British Patent Specification 1,282,992). In this case, a polymer solution is heated up under superatmospheric pressure and expanded through a nozzle with vapour formation, and the vapour/liquid mixture is then delivered through the coiled flow pipe, the product being concentrated further, namely up to a minimum residual solvent content of 1% by weight. The flow pipe is followed by a cyclone separator, in which the vapours are separated from the polymer. The polymer melt is then fed to a twin-shaft screw machine, in which it is purified up to the specification requirement for residual solvent. Disadvantages in this process are the separator and the screw machine. The vapour/liquid mixture flows at a high velocity, frequently at sonic velocity and subsequent expansion, from the flow pipe into the separator. The product thus splashes all over the walls and adheres there, because there are no shear forces, and crusts and frequently also heaps of crusts thus build up in the course of time. A part of the product can also be carried over into the vapour pipes and deposit there and block the pipes. For this reason, the scope for concentrating in the coiled pipe is frequently not fully utilised, but the concentrating is taken therein only to such a stage that the product is still readily flowable in the downstream separator.

It is the object to improve the process of the type mentioned at the outset in such a way that crust formation is avoided and a better yield is obtained.

This object is achieved when the concentrating is taken as far as possible in the first flow pipe, and when the product is then introduced at an angle into a second heatable flow pipe immediately downstream, which contains self-cleaning elements and has at least 50 times the flow cross-section of the first flow pipe, and is brought to the desired end concentration, and the separation of the vapour stream from the polymer stream taking place only downstream of the second flow pipe.

The first flow pipe can be of any desired type, for example a long straight, a meandering or preferably a steadily coiled flow pipe.

Either a rotary pipe with a self-cleaning bladed shaft or a self-cleaning paddle screw apparatus is used as the second flow pipe.

The main advantage of the proposed process is that the separation process and cleaning process are combined in one apparatus. The problem of crust formation in the separator is thus eliminated and it is really possible to take the concentrating in the first flow pipe as far as the apparatus permits. The vapour/liquid jet emerging from the first flow pipe at a high flow velocity directly strikes the wall of the second flow pipe or the paddle screws. The jet energy is thus broken. The tacky polymer precipitates on the walls and is further transferred from there by the scraping elements and the pipe slope to the outlet, while the remaining concentrating takes place. The vapour jet is deflected, largely loses its kinetic energy on the way to the outlet due to the flow cross-section which is substantially enlarged over that of the first flow pipe, and is thus no longer capable of holding any liquid droplets carried over, which are also precipitated on the wall or on the scraper elements.

A further advantage of the process is that the types of apparatus used are substantially less expensive than a twin-shaft screw machine. Moreover, they have an even more favourable surface/volume ratio.

In some cases, it may be possible that too little solvent is present to allow the process to be carried out or the required specification level is not reached in spite of all the measures taken.

In this case, it is advisable additionally to feed inert gas or extraneous steam into the first flow pipe.

In general, even small quantities suffice to meet the specification requirements. It is advantageous to jet the inert gas or extraneous steam together with the polymer solution through the restrictor element into the first flow pipe.

Two units for carrying out the novel process are represented in the drawing purely diagrammatically and are described in more detail below.

Figure 1:
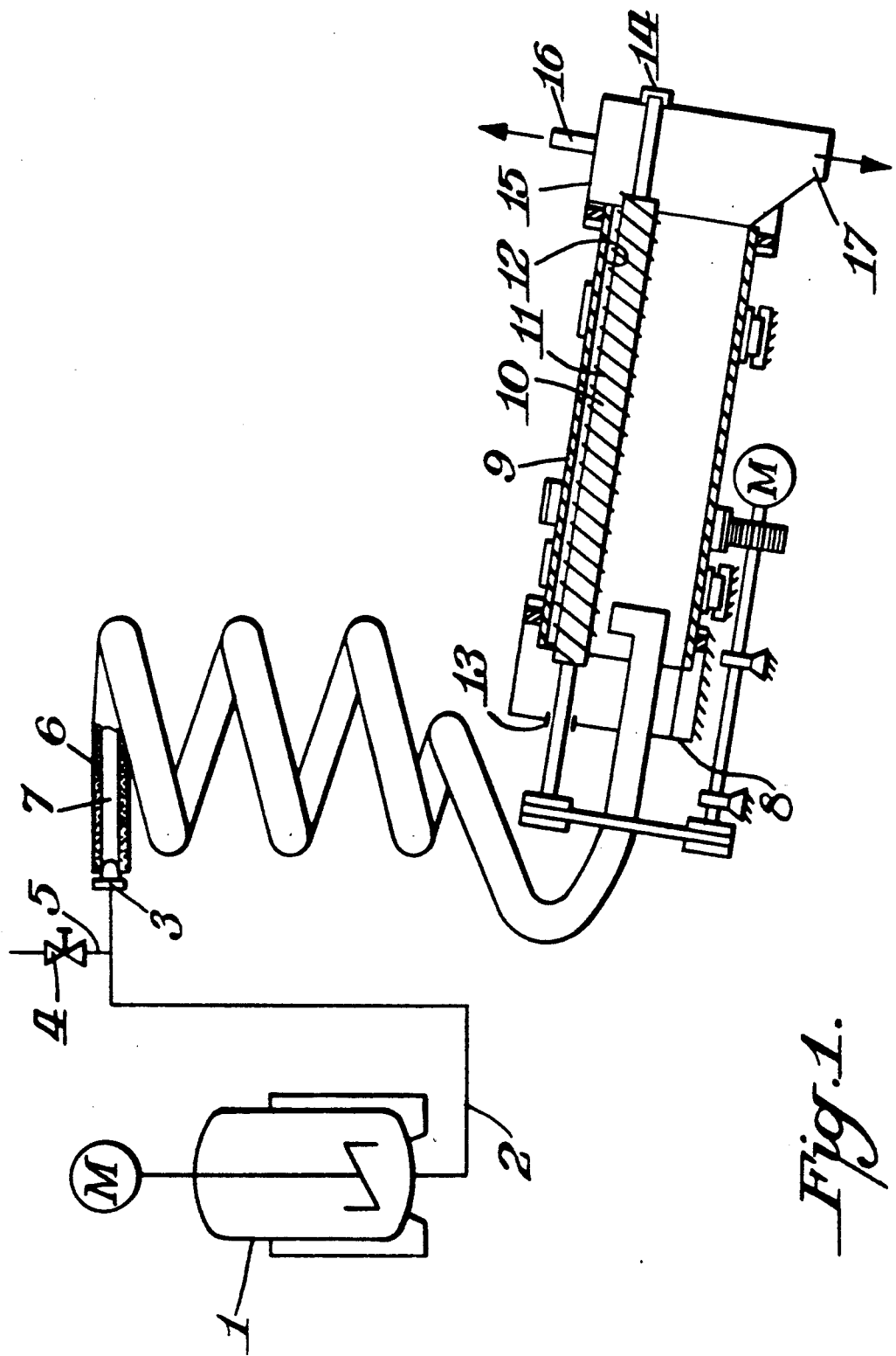
FIG. 1 shows a first unit with a rotary pipe as the second flow pipe.

In FIG. 1, a polymer solution passes from a heatable vessel 1 via a line 2 into a restrictor element 3 which is designed as an expansion nozzle and upstream of which an inert gas line 5 provided with an isolation valve 4 also leads into the line 2. The expansion nozzle 3 is located at the inlet of a flow pipe 7 provided with a heating jacket 6 and designed as a steady coil of 20° pitch. In this flow pipe 7, the polymer solution is further concentrated. At a mean outlet velocity of 80 m/second, this mixture of concentrate and vapours is whirled perpendicularly against the inside wall 12 of a flow pipe 9 which is designed as a rotary pipe and whose flow cross-section is 80 times that of the flow pipe 7. In the rotary pipe 9, a bladed shaft 10, which is driven in the direction opposite to that of the rotary pipe 9 and whose blades 11 are of helical shape and scrape the inside wall 12 of the rotary pipe 9, is provided in the direction of rotation about 50° after the vertex line. The bladed shaft 10 has a bearing 13 in the top shell 8 and a bearing 14 in the bottom shell 15. Within the rotary pipe 9, the product reaches the desired degree of concentrating. The vapours leave the bottom shell 15 through a discharge 16, and the product leaves it through an outlet 17.

Figure 2:
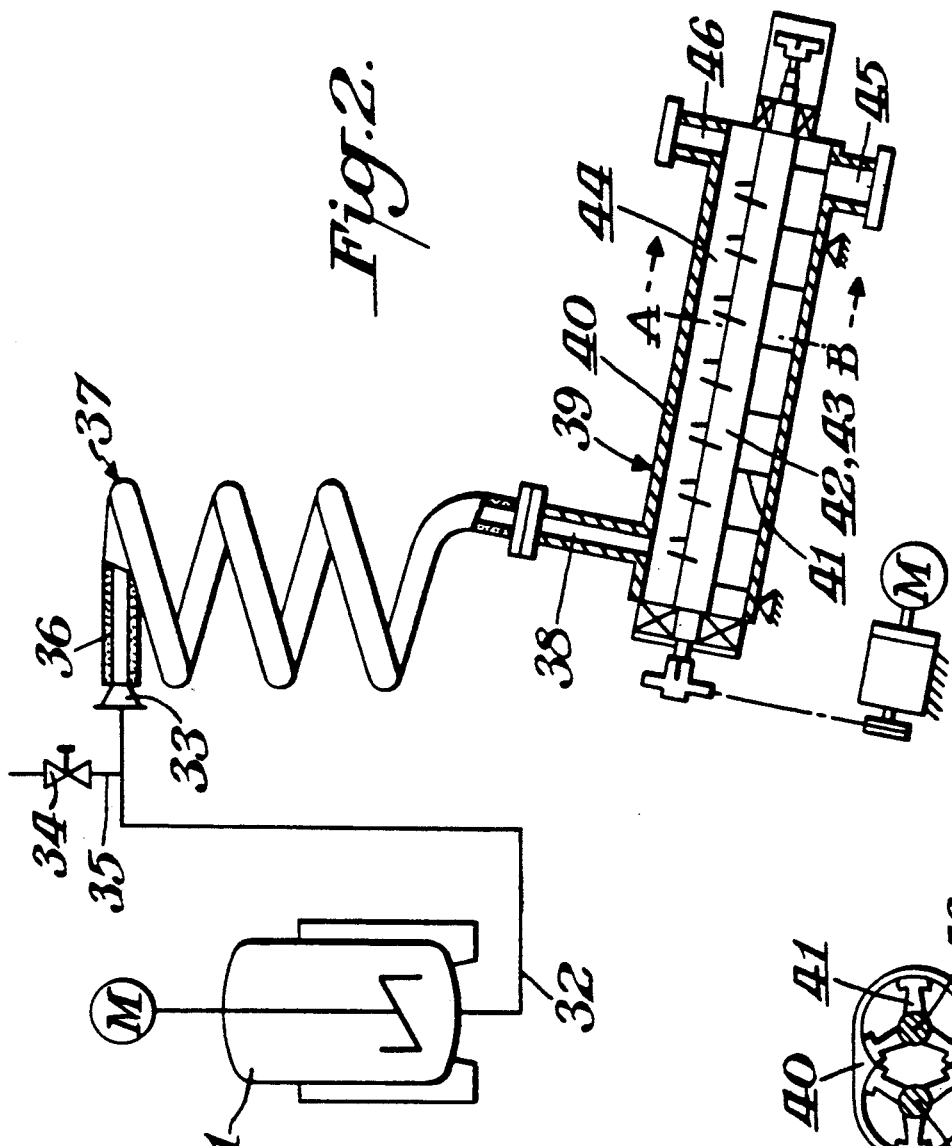
FIG. 2 shows a second unit with a paddle screw as the second flow pipe.
Figure 3:
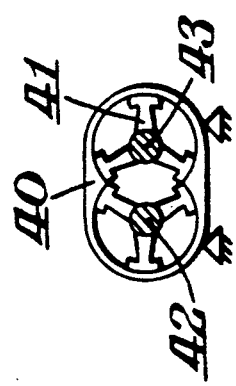
FIG. 3 shows a section along line A, B in FIG. 2.

In FIGS. 2 and 3, a polymer solution passes from a heatable vessel 31 via a line 32 into a restrictor element 33 which is designed as an expansion nozzle and upstream of which an extraneous steam line 35 provided with an isolation valve 34 also leads into the line 32. The expansion nozzle 33 is located at the inlet of a first flow pipe 37 provided with a heating jacket 36 and designed as a steady coil of 25° pitch. In this flow pipe 37, the polymer solution is further concentrated. At a mean flow velocity of 60 m/second, this mixture of concentrate and vapours passes through an inlet branch 38 perpendicularly into a second flow pipe 39 which is designed as a paddle screw apparatus and whose cross-section is 80 times that of the first flow pipe 37. The paddle screw apparatus 39 has a heatable housing 40 in which two shafts 42 and 43 are provided which rotate in opposite directions, mesh with one another and are fitted with paddles 41 at an angle of 10°. The paddles 41 continuously scrape the inside wall 44 of the housing 40 and each other and in this way prevent caking and encrustations. The product concentrated to the desired degree is discharged by an outlet 45, and the vapours escape via an extraction branch 46.

EXAMPLES

Example 1

Concentrating of a polydimethylsiloxane/chlorobenzene solution

| | |
|---|---|
| Throughput: | 29 kg/h |
| Starting composition: | |
| Polydimethylsiloxane | 20% by weight |
| Chlorobenzene | 80% by weight |
| Polydimethylsiloxane viscosity: | 1000 mPa.s (20° C.) |
| First flow pipe: | coiled flow pipe |
| Internal pipe diameter | 15 mm |
| Flow cross-section | 177 mm$^2$ |
| Pipe length | 6 m |
| Coil diameter | 250 mm |
| Pitch | 20° |
| Heating medium | thermally isomeric benzyltoluenes (trade name Marlotherm oil) |
| Heating medium temperature | 300° C. |
| System pressure | 1 bar$_{abs}$ |
| Restrictor element at inlet of the first flow pipe | controlled needle valve |
| Product temperature upstream of the restrictor element | 200° C. |
| Product temperature downstream of the restrictor element | 160° C. |
| Second flow pipe: | Paddle screw apparatus |
| Housing length | 2300 mm |
| Shaft diameter | 45 mm |
| Paddle diameter | 130 mm |
| Inclination of the paddles | 5° |
| Slope of the paddle screw apparatus | 10° |
| Speed of rotation | 71 rpm |
| Flow cross-section | 13,000 mm$^2$ |
| Heating medium | Marlotherm oil |
| Heating medium temperature | 300° C. |
| Residual solvent content | ~400 ppm |

Example 2

Concentrating of a polydimethylsiloxane/chlorobenzene solution with addition of inert gas

| | |
|---|---|
| Throughput: | |
| Solution: | 30 kg/hour |
| Inert gas: | 10 kg/hour |
| Starting composition: | |
| Polydimethylsiloxane: | 80% by weight |
| Chlorobenzene: | 20% by weight |
| All other conditions as in Example 1. | |
| Residual solvent content: | ~2500 ppm |

Example 3

Concentrating of a polydimethylsiloxane/chlorobenzene solution

| | |
|---|---|
| Throughput | 30 kg/hour |
| Starting composition: | |
| Polydimethylsiloxane: | 20% by weight |
| Chlorobenzene: | 80% by weight |

Polydimethylsiloxane viscosity: 500,000 mPa.s
All other conditions as in Example 1.
Residual solvent content ~25,000 ppm=2.5% by weight
Residual solvent content with addition of 12 kg/hour of nitrogen: ~3000 ppm.

Example 4

As in Example 1, but a rotary pipe is used as the second flow pipe in place of the paddle screw apparatus:

| | |
|---|---|
| Housing length | 1000 mm |
| Rotary pipe diameter | 200 mm |
| Diameter of the scraper blades | 50 mm |
| Slope of the rotary pipe | 10° |
| Speed of rotation | 30 rpm |
| Flow cross-section | 13,000 mm$^2$ |
| Heating medium | Marlotherm oil |
| Heating medium temperature | 300° C. |
| Residual solvent content | 500 ppm |

We claim:

1. Continuous process for concentrating polymer solutions up to a required specification level of residual solvent, the product being heated up under pressure and then being expanded in a restrictor element (3, 33) with vapour formation into a heated flow pipe (7, 37) and concentrated therein, characterised in that the concentrating is taken as far as possible in this first flow pipe (7, 37), and that the product is then introduced at an angle into a second heatable flow pipe (9, 39) immediately downstream, which contains self-cleaning elements (10;11;41,42,43) and has at least 50 times the flow cross-section of the first flow pipe (7, 37), and is brought to the desired end concentration, and the separation of the vapour stream from the polymer stream taking place only downstream of the second flow pipe (9, 39).

2. Process according to claim 1, characterised in that, as the second flow pipe (9) a rotary pipe (9) with a self-cleaning bladed shaft (10) is used.

3. Process according to claim 1, characterised in that, as the second flow pipe (39), a self-cleaning paddle screw apparatus (39) is used.

4. Process according to claim 1, characterised in that inert gas is fed together with the polymer solution into the first flow pipe (7).

5. Process according to claim 1, characterised in that extraneous steam is fed together with the polymer solution into the first flow pipe (37).

* * * * *